(12) United States Patent
Tran (10) Patent No.: US 7,976,386 B2
(45) Date of Patent: Jul. 12, 2011

(54) MESH NETWORK GAME CONTROLLER WITH VOICE TRANSMISSION, SEARCH CAPABILITY, MOTION DETECTION, AND/OR POSITION DETECTION

(76) Inventor: Bao Q. Tran, San Jose, CA (US)

(*) Notice: Subject to any disclaimer, the term of this patent is extended or adjusted under 35 U.S.C. 154(b) by 1374 days.

(21) Appl. No.: 11/451,570

(22) Filed: Jun. 12, 2006

(65) Prior Publication Data

US 2007/0298885 A1 Dec. 27, 2007

(51) Int. Cl.
*A63F 9/24* (2006.01)

(52) U.S. Cl. .............. 463/36; 463/1; 463/40; 463/41; 463/42

(58) Field of Classification Search .......... 463/1, 40–42, 463/36
See application file for complete search history.

(56) References Cited

U.S. PATENT DOCUMENTS

| | | | |
|---|---|---|---|
| 5,605,336 | A | 2/1997 | Gaoiran et al. |
| 6,125,277 | A | 9/2000 | Tanaka |
| 6,829,243 | B1 | 12/2004 | Sundhar |
| 6,832,251 | B1 * | 12/2004 | Gelvin et al. ............... 709/224 |
| 6,908,388 | B2 | 6/2005 | Shimizu et al. |
| 6,980,984 | B1 | 12/2005 | Huffman et al. |
| 2005/0266831 | A1 | 12/2005 | Roth |
| 2005/0266863 | A1 | 12/2005 | Benco et al. |
| 2006/0077968 | A1 | 4/2006 | Pitsoulakis et al. |
| 2006/0232611 | A1 * | 10/2006 | Brooke ........................ 345/671 |
| 2007/0143479 | A1 * | 6/2007 | Putnam et al. ............... 709/226 |
| 2008/0300046 | A1 * | 12/2008 | Gagner et al. ................ 463/25 |

OTHER PUBLICATIONS

ZigBee Web Page at http://zigbee.org/en/index.asp dated Jun. 12, 2006.

* cited by examiner

*Primary Examiner* — Pierre E Elisca
(74) *Attorney, Agent, or Firm* — Tran & Associates (57) ABSTRACT

Systems and methods are disclosed having a mesh network such as a ZigBee mesh network, a game controller coupled to the mesh network; and a display device coupled to the mesh network.

18 Claims, 4 Drawing Sheets

---

Capture search query from remote keypad or verbally from user spoken search query (202)

If the query is verbal, convert user spoken search query into one or more speech symbols (204)

Determine a disambiguating information such as a point of interest (206)

Transmit the search query and the point of interest over a network to a server that communicates with one or more search engines (208)

Optionally improve the recognition accuracy based on the point of interest as well as the user history (210)

Generate a result based on the search query and the point of interest (212)

MESH NETWORK GAME CONTROLLER WITH VOICE TRANSMISSION, SEARCH CAPABILITY, MOTION DETECTION, AND/OR POSITION DETECTION

The present application is related to the following applications: Ser. Nos. 11/433,282—Mesh Network Health Care Monitoring Appliance; 11/435,068—Mesh Network Monitoring Appliance; 11/439,631—Mesh Network Stroke Monitoring Appliance; 11/480,231—Mesh Network Personal Emergency Response Appliance; 12/426,228—Mesh Network Monitoring Appliance; 12/426,232—Health Monitoring Appliance; 12/486,810—Mesh Network Stroke Monitoring Appliance; 60/939,856—Mesh Network Stroke Monitoring Appliance; 11/405,326—Mesh Network Telephone System; 11/451,200—Mesh Network Door Lock.

BACKGROUND

Recently Nintendo announced the Revolution controller. Shaped like a television remote control, the Revolution controller uses internal sensors to translate the user's wrist, arm and hand movements on screen. Revolution enables gamers to move his/her arm in a virtual sword fight or taking virtual aim at onscreen monsters.

U.S. Pat. No. 6,908,388 discloses a game system displaying a three-dimensional game space on a display includes a housing held by a player, a tilt sensor provided on the housing, a viewpoint coordinates determination mechanism for determining viewpoint coordinates in accordance with an output value of the tilt sensor, and a game image generation processing mechanism for generating a game image based on the viewpoint coordinates determined by the viewpoint coordinates determination mechanism. The game system allows the player to feel as if the three-dimensional game space is tilted in accordance with a tilt of a game device, etc., with a minimal processing burden.

SUMMARY

In a first aspect, game systems and methods are disclosed having a mesh network (such as a ZigBee mesh network, for example), a game controller coupled to the mesh network; and a display device coupled to the mesh network.

In a second aspect, a game system includes a mesh network; a network game controller coupled to the mesh network including one or more motion detectors and an in-door position detector; and a display device coupled to the mesh network, wherein the mesh network game controller comprises a Voice Over Internet Protocol (VOIP) telephone and wherein the one or more motion detectors allow a player to perform one of: wield the controller like a sword, wave the controller like a conductor's baton, swing the controller like a baseball bat.

Implementations of the first and second aspects may include one or more of the following. The mesh network can be an 805.15 network. The mesh network game controller can be a Voice Over Internet Protocol (VOIP) telephone. One or more motion detector sensors can be used. The motion detector can be accelerometers, among others, and can allow a player to perform one of: wield the controller like a sword, wave the controller like a conductor's baton, swing the controller like a baseball bat. The controller can have a TV remote form factor. A server connected to the POTS or PSTN can receive a search query from the controller for searching one or more databases based on the search query and returning a search result on the display. A third party associated with one of the search results is selected to call back the game controller or a telephone number associated with the game controller. The server transmits a caller identification (Caller ID) number to the entity for calling back a player and wherein the third party pays a fee for each Caller ID. The databases comprise one or more of: music, food, restaurant, movie, map, telephone directory, news, blogs, weather, stocks, calendar, sports, horoscopes, lottery, messages, traffic, direction. The controller can interact with one or more mesh network appliances to provide one of: home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, remote diagnostic. The controller can be communicate with a cellular telephone to answer calls directed at the cellular telephone. The controller can synchronize calendar, contact, emails, blogs, or instant messaging with the cellular telephone or a personal computer. The controller can monitor player movements and falls using the accelerometer. The controller can acquire in-door position information through wireless signals from one or more mesh network appliances to provide location information. Triangulation can be used for in-door position determination. Radio signal strength, RF time of arrival, or RF angle of arrival information can be used for position determination. The position can be further determined by comparing other wireless nodes' RF characteristics and their known position. A call center can be linked to the controller to provide a human response or a remote telephone can be linked to the controller to provide verbal communication for the game. A web server can be connected to the mesh network and to the POTS to provide information to an authorized remote user. A wireless router can be connected to the mesh network. The wireless router can be one of: 802.11 router, 802.16 router, WiFi router, WiMAX router, Bluetooth router, X10 router. A mesh network appliance can be connected to a power line to communicate X10 data to and from the mesh network.

In another aspect, a system includes a mesh network; a mesh network base station in communication with the mesh network, the mesh network base station including a telephone jack wired to a plain old telephone service (POTS) or a public switched telephone network (PSTN) land-line; and a telephone in communication with the base station over the mesh network.

Implementations of the above system may include one or more of the following. The mesh network can be an 805.15 network, a ZigBee network or a compatible 2.4 GHz network. The game controller with voice capability records a message from a caller, wherein the game controller acting as a telephone answers two calls by selecting a first line or a second line and wherein the telephone receives distinctive ring tones and rings with a melody or distinctive ring pattern. The game controller with voice capability can be a Voice Over Internet Protocol (VOIP) telephone. A remote server can communicate with the mesh network through the Plain Old Telephone System (POTS) or the Public Switched Telephone Network (PSTN), the server receiving a search query from the game controller with voice capability; the server searching one or more databases based on the search query and returning a search result on the display. A third party associated with one of the search results is selected to call back the game controller with voice capability. The server can transmit the controller identification (Caller ID) number to the entity for calling back the game controller and wherein the third party pays a fee for each Caller ID. The databases can be a regular database or a federated database providing taxonomy of: music, food, restaurant, movie, map, telephone directory, news, blogs, weather, stocks, calendar, sports, horoscopes, lottery, messages, traffic, or direction. The system includes one or more mesh network appliances to provide home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnostics. The game controller can be connected to a cellular telephone to answer calls directed at the cellular telephone. The connection can be wired or wireless using Bluetooth or ZigBee. The game controller synchronizes calendar, contact, emails, blogs, or instant messaging with the cellular telephone. Similarly, the game controller synchronizes calendar, contact, emails, blogs, or instant messaging with a personal computer. The system can include a patient monitoring appliance coupled to the POTS or PSTN through the mesh network. The patient monitoring appliance monitors drug usage and patient falls. The patient monitoring appliance monitors patient movement. An in-door positioning system links one or more mesh network appliances to provide location information. A call center can call to the game controller to provide a human response. A web server can communicate with the Internet through the POTS to provide information to an authorized remote user who logs into the server. A wireless router such as 802.11 router, 802.16 router, WiFi router, WiMAX router, Bluetooth router, X10 router can be connected to the mesh network. A mesh network appliance can be connected to a power line to communicate X10 data to and from the mesh network.

In another aspect, a system includes a cordless game controller having a ZigBee transceiver to communicate digitized voice and data over a ZigBee wireless link; and a base station wirelessly coupled to the cordless game controller over the ZigBee wireless link, the base station having a telephone jack coupled to a plain old telephone service (POTS) or a public switched telephone network (PSTN) land-line.

In implementations of the ZigBee cordless phone, a server located on the POTS or PSTN office can receive a search query from the game controller; the server searching one or more databases based on the search query and returning a search result to display on the game controller, wherein the server provides information to one of: directory assistance, yellow page directory, white page directory, search engine, music, food, restaurant, movie, map, telephone directory, news, blogs, weather, stocks, calendar, sports, horoscopes, lottery, messages, traffic, direction, wherein the server transmits the game controller's caller identification (Caller ID) number to a third party to call back the game controller and wherein the third party pays a fee for each Caller ID.

In another aspect, a method to operate a game controller includes receiving a search query from the game controller; transmitting the search query to a search engine; searching one or more taxonomic databases based on the search query; and returning a search result to display on the game controller.

In another aspect, a system includes a game controller coupled to a wide area network; and a server coupled to the game controller over the wide area network, the server receiving a search query from the game controller; the server searching one or more taxonomic databases based on the search query and returning a search result to the game controller.

In yet another aspect, a system includes a handheld game controller coupled to a plain old telephone service (POTS) or a public switched telephone network (PSTN), the handheld game controller having a modem; a server coupled to the game controller over the POTS or PSTN, the server receiving a search query from the game controller; the server searching one or more databases based on the search query and returning a search result to display on the game controller.

In a further aspect, a game controller system for making free VOIP calls includes a handset with a display, a keypad, and a modem communicating with a remote server. The user make local and long distance calls for free and in addition may have access to value added services that include but not be limited to music, food, restaurant, movie, map, telephone directory, news, blogs, weather, stocks, calendar, sports, horoscopes, lottery, messages, or traffic database. The display of the phone periodically shows information of interest to the user (such as ads), based on a profile that the user makes when registering with the system. The profile is updated to track services and products as the user actually uses.

Implementations of the above may include one or more of the following. The system can capture a verbal search request and transmitting the verbal search request to the search engine. The verbal search request comprises one of: phoneme, diphone, triphone, syllable, demisyllable, cepstral coefficient, cepstrum coefficient. The search user can designate an entity from one of the search results to call back the game controller. One way to select is to click on a link and click on a subsequent button to confirm that the company associated with the link should call the user's game controller and the system can transmit the game controller's caller identification (Caller ID) number to the entity for calling back the game controller. The entity pays a fee for each Caller ID for referral fee, advertising fee, membership fee, or any other suitable business model fees. The game controller can be a Voice Over Internet Protocol (VOIP) telephone, a cellular telephone, a WiFi telephone, a WiMAX telephone. The phone can provide directions to one of: a store, a retailer, a company, a venue. The taxonomic databases can be music, food, restaurant, movie, map, telephone directory, news, blogs, weather, stocks, calendar, sports, horoscopes, lottery, messages, or traffic database. The system can perform automated position determination with one of: triangulation based location determination, WiFi location determination, GPS, assisted GPS, GLONASS, assisted GLONASS, GALILEO, assisted GALILEO.

In yet another aspect, systems and methods are disclosed to operate a mobile device. The system includes a message center; an engine coupled to the message center; and a mobile device wirelessly coupled to the message center, wherein the engine specifies one or more meeting locations and wherein at least one meeting location comprises a location designated by an advertiser.

In another aspect, systems and methods are disclosed to operate a mobile device by capturing user speech; converting the user speech into one or more speech symbols; transmitting the speech symbols over a wireless messaging channel to an engine (such as a search engine or a game engine, among others); and generating a result based on the speech symbols.

In yet another aspect, a system operates a mobile device with a message center; an engine (such as a search engine or a game engine, for example) coupled to the message center;

and a mobile device wirelessly coupled to the message center, the mobile device capturing user speech, converting the user speech into one or more speech symbols; transmitting the speech symbols over a wireless messaging channel to the engine; and receiving a search result from the engine based on the speech symbols.

Implementations of the above aspects may include one or more of the following. The disambiguating symbol can be a location. The system can improve recognition accuracy based on the location information. The system can refine the result based on user history. The system can analyze usage pattern from a population of users to refine the result. The result can be ranked based on payment by an entity that is the target of the search. The system can search for one of: services, people, products and companies. The system can enhance a search for one of: services, people, products and companies by tailoring the search with one of: telephone area code, zip code, airport code. The system can also enhance a search for one of: services, people, products and companies by tailoring the search with automated position determination. The automated position determination can include triangulation based location determination, WiFi location determination, GPS, assisted GPS, GLONASS, assisted GLONASS, GALILEO, or assisted GALILEO.

In another aspect, one of the appliances can be a mesh network router that includes a modem coupled to a wide area network, one or more 802.11 (WiFi) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

In another aspect, a mesh network router includes a modem coupled to a wide area network, one or more 802.16 (WiMax) radios coupled to the modem and one or more 802.15 (ZigBee) radios coupled to the modem. In one implementation, the modem can be a landline modem, a DSL modem, a cable modem, or a cellular modem. In another implementation, the mesh router can include a Bluetooth radio or an ultra wideband (UWB) radio.

Advantages of the system may include one or more of the following. The system is inexpensive to manufacture and provides a full-featured home/office wireless game controller that can handle voice as well as data and provides search capability, motion detection and/or in-door position sensing capability.

DESCRIPTION

Figure 1:
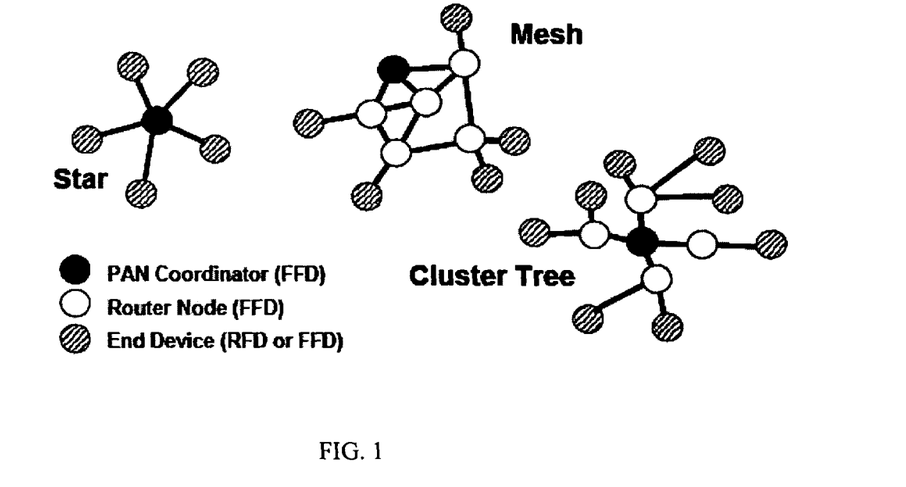
FIG. 1 shows a typical organization of a mesh network that includes a game controller node.

FIG. 1A shows an exemplary mesh network that includes a mesh network game controller such as a wired game controller as well as a cordless game controller. In one embodiment, the mesh network is an IEEE 802.15.4 (ZigBee) network. IEEE 802.15.4 defines two device types; the reduced function device (RFD) and the full function device (FFD). In ZigBee these are referred to as the ZigBee Physical Device types. In a ZigBee network a node can have three roles: ZigBee Coordinator, ZigBee Router, and ZigBee End Device. These are the ZigBee Logical Device types. The main responsibility of a ZigBee Coordinator is to establish a network and to define its main parameters (e.g. choosing a radio-frequency channel and defining a unique network identifier). One can extend the communication range of a network by using ZigBee Routers. These can act as relays between devices that are too far apart to communicate directly. ZigBee End Devices do not participate in routing. An FFD can talk to RFDs or other FFDs, while an RFD can talk only to an FFD. An RFD is intended for applications that are extremely simple, such as a light switch or a passive infrared sensor; they do not have the need to send large amounts of data and may only associate with a single FFD at a time. Consequently, the RFD can be implemented using minimal resources and memory capacity and have lower cost than an FFD. An FFD can be used to implement all three ZigBee Logical Device types, while an RFD can take the role as an End Device.

One embodiment supports a multicluster-multihop network assembly to enable communication among every node in a distribution of nodes. The algorithm should ensure total connectivity, given a network distribution that will allow total connectivity. One such algorithm of an embodiment is described in U.S. Pat. No. 6,832,251, the content of which is incorporated by referenced. The '251 algorithm runs on each node independently. Consequently, the algorithm does not have global knowledge of network topology, only local knowledge of its immediate neighborhood. This makes it well suited to a wide variety of applications in which the topology may be time-varying, and the number of nodes may be unknown. Initially, all nodes consider themselves remotes on cluster zero. The assembly algorithm floods one packet (called an assembly packet) throughout the network. As the packet is flooded, each node modifies it slightly to indicate what the next node should do. The assembly packet tells a node whether it is a base or a remote, and to what cluster it belongs. If a node has seen an assembly packet before, it will ignore all further assembly packets.

The algorithm starts by selecting (manually or automatically) a start node. For example, this could be the first node to wake up. This start node becomes a base on cluster 1, and floods an assembly packet to all of its neighbors, telling them to be remotes on cluster 1. These remotes in turn tell all their neighbors to be bases on cluster 2. Only nodes that have not seen an assembly packet before will respond to this request, so nodes that already have decided what to be will not change their status. The packet continues on, oscillating back and forth between "become base/become remote", and increasing the cluster number each time. Since the packet is flooded to all neighbors at every step, it will reach every node in the network. Because of the oscillating nature of the "become base/become remote" instructions, no two bases will be adjacent. The basic algorithm establishes a multi-cluster network with all gateways between clusters, but self-assembly time is proportional with the size of the network. Further, it includes only single hop clusters. Many generalizations are possible, however. If many nodes can begin the network nucleation, all that is required to harmonize the clusters is a mechanism that recognizes precedence (e.g., time of nucleation, size of sub-network), so that conflicts in boundary clusters are resolved. Multiple-hop clusters can be enabled by means of establishing new clusters from nodes that are N hops distant from the master.

Having established a network in this fashion, the masters can be optimized either based on number of neighbors, or other criteria such as minimum energy per neighbor communication. Thus, the basic algorithm is at the heart of a number of variations that lead to a scalable multi-cluster network that establishes itself in time, and that is nearly independent of the number of nodes, with clusters arranged according to any of a wide range of optimality criteria. Network synchronism is established at the same time as the network connections, since the assembly packet(s) convey timing information outwards from connected nodes.

The network nodes can be mesh network appliances to provide voice communications, home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, or remote diagnostics. The game controller can be connected to a cellular telephone to answer calls directed at the cellular telephone. The connection can be wired or wireless using Bluetooth or ZigBee. The game controller synchronizes calendar, contact, emails, blogs, or instant messaging with the cellular telephone. Similarly, the game controller synchronizes calendar, contact, emails, blogs, or instant messaging with a personal computer. A web server can communicate with the Internet through the POTS to provide information to an authorized remote user who logs into the server. A wireless router such as 802.11 router, 802.16 router, WiFi router, WiMAX router, Bluetooth router, X10 router can be connected to the mesh network.

A mesh network appliance can be connected to a power line to communicate X10 data to and from the mesh network. X10 is a communication protocol that allows up to 256 X10 products to talk to each other using the existing electrical wiring in the home. Typically, the installation is simple, a transmitter plugs (or wires) in at one location in the home and sends its control signal (on, off, dim, bright, etc.) to a receiver which plugs (or wires) into another location in the home. The mesh network appliance translates messages intended for X10 device to be relayed over the ZigBee wireless network, and then transmitted over the power line using a ZigBee to X10 converter appliance.

An in-door positioning system links one or more mesh network appliances to provide location information. Inside the home or office, the radio frequency signals have negligible multipath delay spread (for timing purposes) over short distances. Hence, radio strength can be used as a basis for determining position. Alternatively, time of arrival can be used to determine position, or a combination of radio signal strength and time of arrival can be used. Position estimates can also be achieved in an embodiment by beamforming, a method that exchanges time-stamped raw data among the nodes. While the processing is relatively more costly, it yields processed data with a higher signal to noise ratio (SNR) for subsequent classification decisions, and enables estimates of angles of arrival for targets that are outside the convex hull of the participating sensors. Two such clusters of ZigBee nodes can then provide for triangulation of distant targets. Further, beamforming enables suppression of interfering sources, by placing nulls in the synthetic beam pattern in their directions. Another use of beamforming is in self-location of nodes when the positions of only a very small number of nodes or appliances are known such as those sensors nearest the wireless stations. In one implementation where each node knows the distances to its neighbors due to their positions, and some small fraction of the nodes (such as those nearest a PC with GPS) of the network know their true locations. As part of the network-building procedure, estimates of the locations of the nodes that lie within or near the convex hull of the nodes with known position can be quickly generated. To start, the shortest distance (multihop) paths are determined between each reference node. All nodes on this path are assigned a location that is the simple linear average of the two reference locations, as if the path were a straight line. A node which lies on the intersection of two such paths is assigned the average of the two indicated locations. All nodes that have been assigned locations now serve as references. The shortest paths among these new reference nodes are computed, assigning locations to all intermediate nodes as before, and continuing these iterations until no further nodes get assigned locations. This will not assign initial position estimates to all sensors. The remainder can be assigned locations based on pairwise averages of distances to the nearest four original reference nodes. Some consistency checks on location can be made using trigonometry and one further reference node to determine whether or not the node likely lies within the convex hull of the original four reference sensors.

In two dimensions, if two nodes have known locations, and the distances to a third node are known from the two nodes, then trigonometry can be used to precisely determine the location of the third node. Distances from another node can resolve any ambiguity. Similarly, simple geometry produces precise calculations in three dimensions given four reference nodes. But since the references may also have uncertainty, an alternative procedure is to perform a series of iterations where successive trigonometric calculations result only in a delta of movement in the position of the node. This process can determine locations of nodes outside the convex hull of the reference sensors. It is also amenable to averaging over the positions of all neighbors, since there will often be more neighbors than are strictly required to determine location. This will reduce the effects of distance measurement errors. Alternatively, the network can solve the complete set of equations of intersections of hyperbola as a least squares optimization problem.

In yet another embodiment, any or all of the nodes may include transducers for acoustic, infrared (IR), and radio frequency (RF) ranging. Therefore, the nodes have heterogeneous capabilities for ranging. The heterogeneous capabilities further include different margins of ranging error. Furthermore, the ranging system is re-used for sensing and communication functions. For example, wideband acoustic functionality is available for use in communicating, bistatic sensing, and ranging. Such heterogeneous capability of the sensors 40 can provide for ranging functionality in addition to communications functions. As one example, repeated use of the communications function improves position determination accuracy over time. Also, when the ranging and the timing are conducted together, they can be integrated in a self-organization protocol in order to reduce energy consumption. Moreover, information from several ranging sources is capable of being fused to provide improved accuracy and resistance to environmental variability. Each ranging means is exploited as a communication means, thereby providing improved robustness in the presence of noise and interference. Those skilled in the art will realize that there are many architectural possibilities, but allowing for heterogeneity from the outset is a component in many of the architectures.

The term "positional measurement," as that term is used herein, is not limited to longitude and latitude measurements, or to metes and bounds, but includes information in any form from which geophysical positions can be derived. These include, but are not limited to, the distance and direction from a known benchmark, measurements of the time required for certain signals to travel from a known source to the geophysical location where the signals may be electromagnetic or other forms, or measured in terms of phase, range, Doppler or other units.

The system can include a patient monitoring appliance coupled to the POTS or PSTN through the mesh network. The patient monitoring appliance monitors drug usage and patient falls. The patient monitoring appliance monitors patient movement. A call center can call to the game controller to provide a human response.

Figure 2:
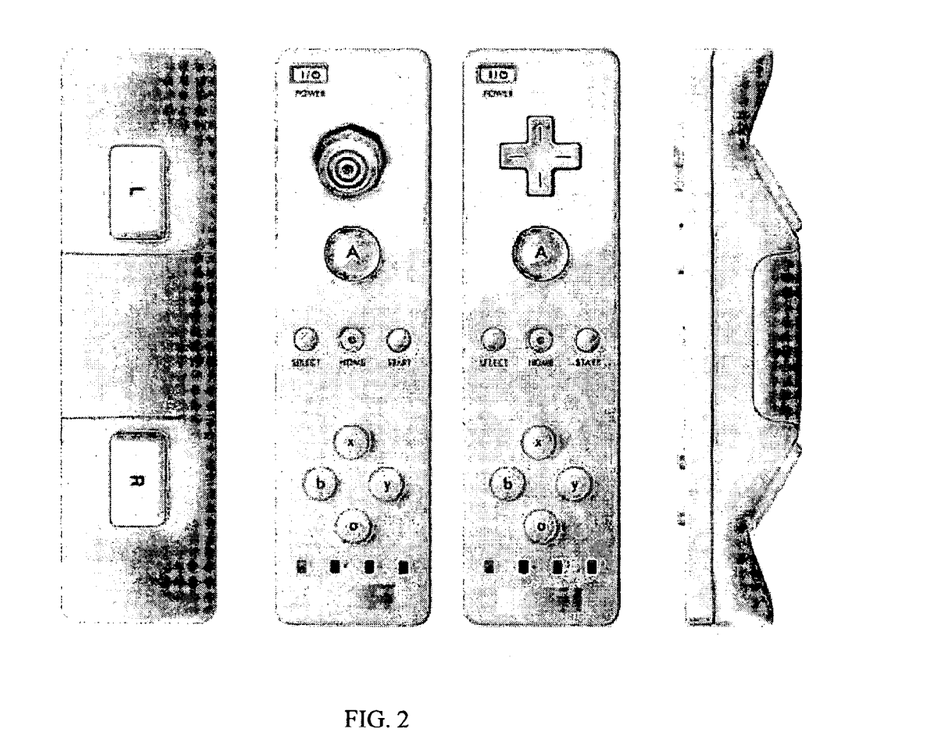
FIG. 2 shows an exemplary game remote device housing.

FIG. 2 shows an exemplary game controller housing. In one embodiment, the game controller has a TV remote form factor. In one implementation, the housing resemble Nintendo's Revolution or Wii controller with the addition of the mesh network speaker and microphone ports thereto. The electronics of the controller is shown in FIG. 3.

Figure 3:
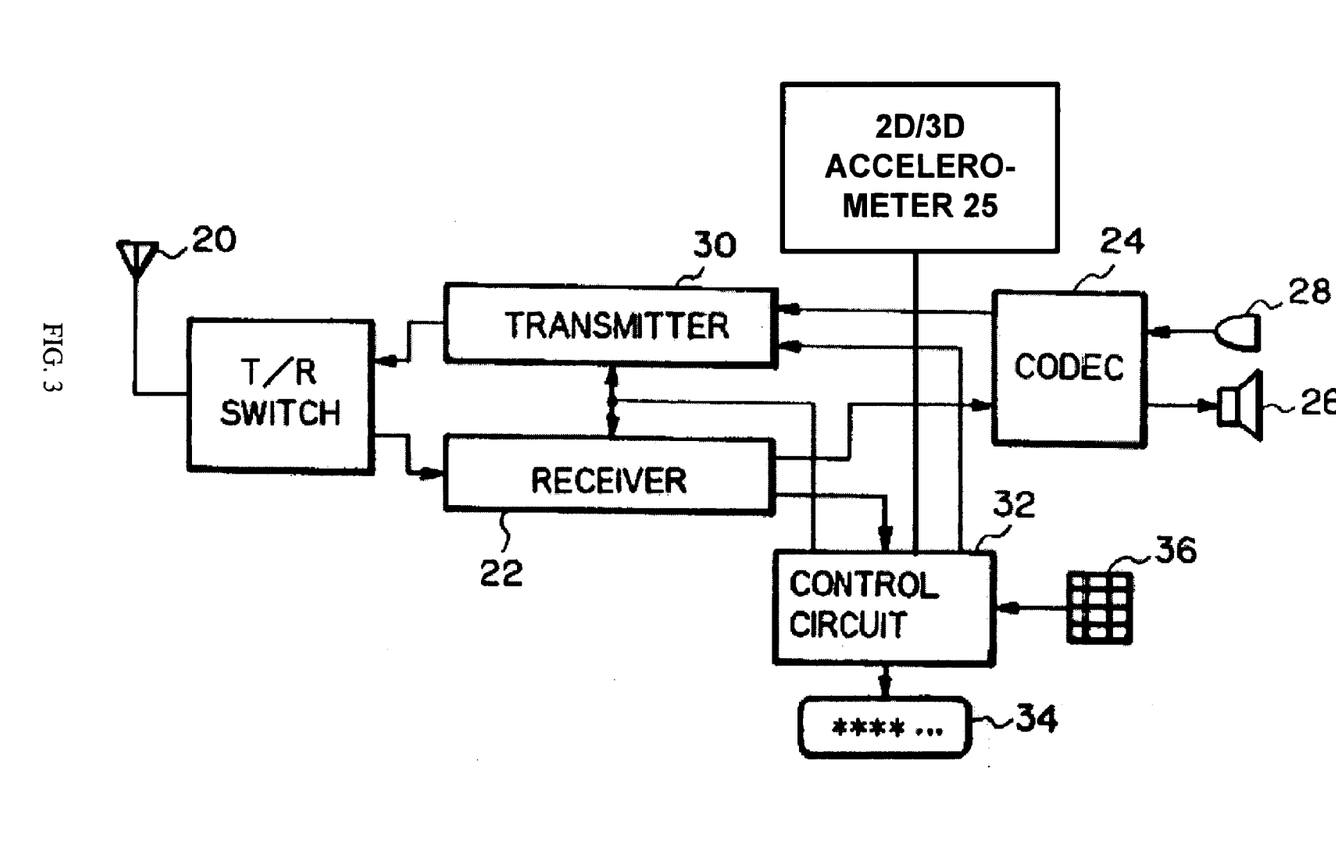
FIG. 3 shows a schematic of an exemplary mesh network game controller that can transmit voice and can detect motion and position.

FIG. 3 shows an exemplary mesh network node which acts as a cordless game controller with voice transmission. In FIG. 2, an antenna 20 is provided for transmitting and receiving control data and voice data to/from a base station; a receiver 22 for receiving a signal from the antenna 20 and demodulates it to separately extracts encoded control data and voice data; a codec 24 for decoding the voice data from the receiver 22 to reproduce a received signal from a loud speaker 26 and for encoding a sound applied to a microphone 28 to send an encoded sound signal to a transmitter 30 for modulating the encoded sound signal to transmit the signal from the antenna 20; and a control circuit 32 which can be a microcontroller or processor for controlling operations of the receiver 22 and the transmitter 30, controlling transmission and reception of a call by receiving the control data from the receiver 22, causing a display device 34 to display received display data, and supplying control data inputted from a plurality of buttons or key pads 36 to the transmitter 30 and displaying the control data on the display device 34. One or more accelerometers 25 such as 23D or 3D accelerometers can communicate motion data to the controller 32.

In one implementation, the receiver 22, codec 24, transmitter 30, and control circuit 32 can be a single chip ZigBee system on a chip (SOC) that contains an IEEE 802.15.4 radio-transceiver, a microcontroller, program/data memory (flash and RAM) and necessary peripherals. The microcontroller is programmed to detect position information as well as to collect data from accelerometers 25. The accelerometer data is sampled from 23D or 3D accelerometers. The position information can be determined using triangulation or by reading signal strength from two or more other mesh network nodes and determine the user's position relative to the strength of the received RF signal. The SOC greatly reduces power consumption and cost while improving the performance of the mesh network game controller.

The mesh network game controller with voice capability communicates wirelessly with a mesh network node acting as a base station in communication with the mesh network. The mesh network base station includes a telephone jack wired to a plain old telephone service (POTS) or a public switched telephone network (PSTN) land-line. When a call comes in, the base station digitizes the audio and compresses the digitized audio data for transmission over the ZigBee wireless mesh network to the cordless game controller with voice capability of FIG. 3. A full duplex link is established between the base station and the game controller so that transmission of voice and/or data occurs in two directions simultaneously. For example, the game controller with voice capability is a full-duplex device because both parties can talk at once.

The game controller with voice capability provides common functionality such as speaker phone capability, voice recording capability to capture a message from a caller, multi-line capability where the game controller answers two calls by selecting a first line or a second line, or distinctive ring tones and rings with a melody or distinctive ring pattern. The game controller with voice capability can be a Voice Over Internet Protocol (VOIP) telephone.

A remote server can communicate with the mesh network through the wired Plain Old Telephone Service (POTS) system or the Public Switched Telephone Network (PSTN) system. The server receives a search query from the game controller with voice capability; searches one or more databases based on the search query and returns a search result on the display of the game controller. A third party associated with one of the search results is selected to call back the game controller. The server can transmit the game controller's caller identification (Caller ID) number to the entity for calling back the game controller and wherein the third party pays a fee for each Caller ID. The databases can be a regular database or a federated database providing taxonomy of: music, food, restaurant, movie, map, telephone directory, news, blogs, weather, stocks, calendar, sports, horoscopes, lottery, messages, traffic, or direction. The databases can also be an internal corporate database or intranet that can be searched by a search engine and rendered through the PBX system.

Figure 4:
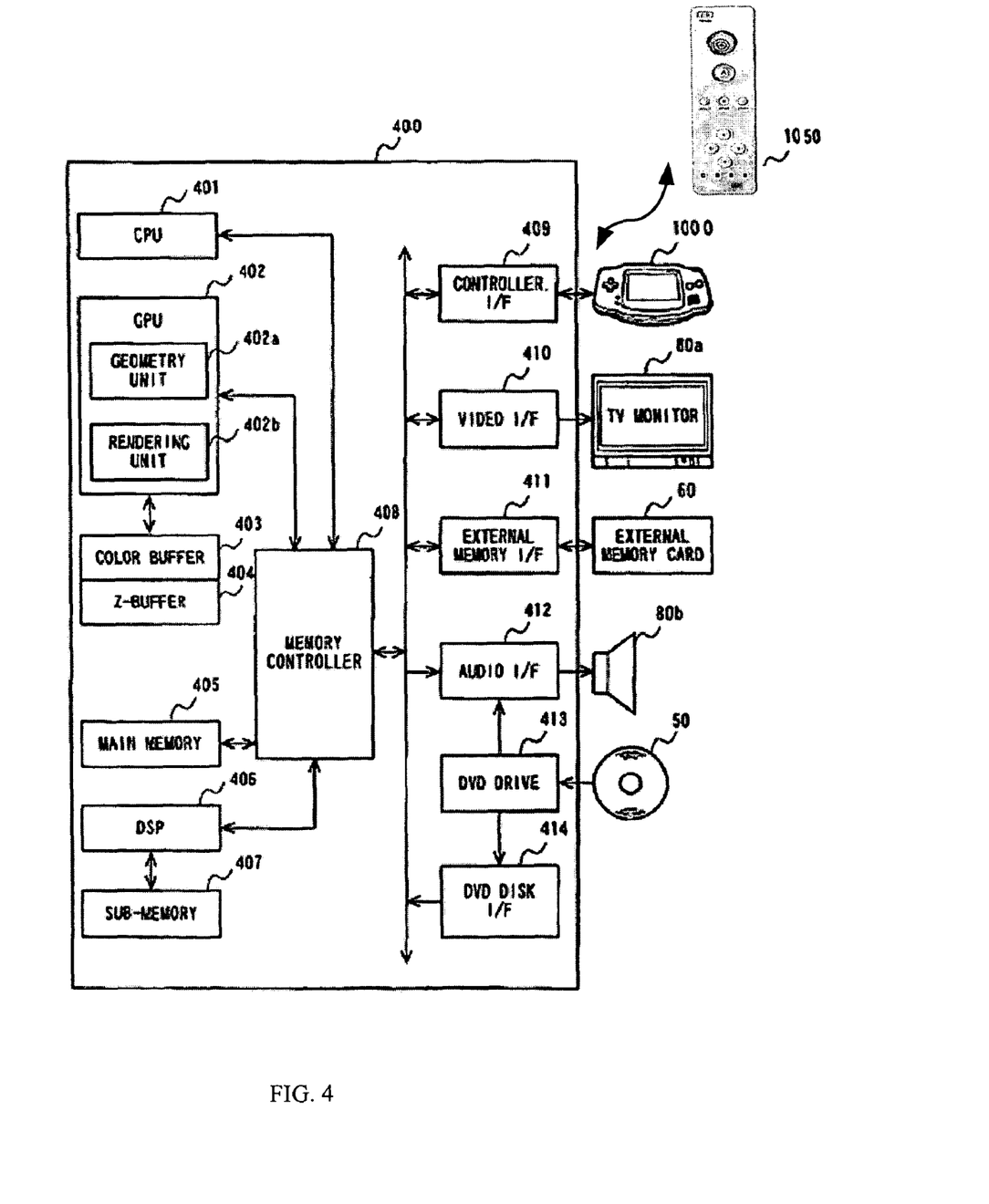
FIG. 4 shows an exemplary game system with the mesh network game controller of FIG. 3.

FIG. 4 is a block diagram showing the hardware structure of the game system 400. The game device 400 includes a calculating section (a CPU 401, a graphics processing unit (GPU) 402, and a digital signal processor (DSP) 406), a storage section (a main memory 405, a color buffer 403, a Z-buffer 404, and a sub-memory 407), various interface (I/F) sections (409 to 412, and 414), a memory controller 408, and a DVD drive 413. As shown in FIG. 4, the memory controller 408 interconnects the calculating section, the storage section, and the interface sections, and controls data transfer between the components included in the above-described sections. The DVD drive 413 reads the DVD-ROM 50 mounted on the game device 400. The DVD-ROM 50 stores the game program or various game data. The game program stored in the DVD-ROM 50 is loaded into the main memory 405 via a DVD disk I/F 414 and the memory controller 408. The CPU 401 executes the game program loaded into the main memory 405. During the game, the player operates the plurality of operation switches of the handheld game device 1000. The handheld game device 1000 outputs an operation input in accordance with the above-described operation performed by the player to the game device 400 via the communication cable 70a. The operation input output from the handheld game device 1000 is input into the CPU 401 via a controller I/F 409 and the memory controller 408. Based on the operation input from the handheld game device 10, the CPU 401 executes a predetermined game process. Similarly, an output from the acceleration sensor 154 included in the cartridge 15 inserted into the handheld game device 10 is also output to the game device 40 via the communication cable 70a, and input into the CPU 401. The GPU 402 mainly generates image data in accordance with control from the CPU 401. The GPU 402 includes a geometry unit 402a and a rendering unit 402b, and is connected to a memory (the color buffer 403 and the Z-buffer 404) dedicated to image processing. Note that a portion of the main memory 405 may be allocated to image processing as a dedicated area in place of a memory dedicated to image processing. The geometry unit 402a and the rendering unit 402b are circuits for performing processing of three-dimensional computer graphics. The geometry unit 402a performs processing for determining a position (a position in a game space, which is represented by three-dimensional coordinates) of an object in a virtual three-dimensional space. The rendering unit 402b performs processing for generating a two-dimensional image to be displayed on the television 800 based on the three-dimensional coordinates obtained by the geometry unit 402a. The color buffer 403 stores the two-dimensional image generated by the rendering unit 402b, and the Z-buffer 404 stores information on depth of the three-dimensional computer graphics. With the above-described components, the GPU 402 generates image data to be displayed on the television 80, and outputs appropriately the generated image data to the television 80 via the memory controller 408 and a video I/F 410. The DSP 406 mainly generates audio data in accordance with control from the CPU 401. The sub-memory 407 is a working memory of the DSP 406. The audio data generated by the DSP 406 is output to a loud speaker 80b of the television 80 via the memory controller 408 and an audio I/F 412. Note that the audio signal from the game device 40 may be output from a loud speaker that is not built into the television 80. The mesh network game controller 1050 is the controller shown in FIG. 3 with an acceleration sensor and a position sensor. The acceleration sensor can be a dual-axis (23D) or a tri-axis (3D) acceleration sensor, and outputs the magnitudes of tilt in two directions, respectively, by detecting gravity. The acceleration sensor is placed in the controller so as to detect a tilt of the controller 1050 tilted forward or backward, or to the right or left. When the game controller 1050 is held horizontally, the X-axis is an axis in a left-to-right direction, the Z-axis is an axis in a forward direction, and the Y-axis is an axis in a vertical direction. The acceleration sensor detects a tilt in the X-axis direction of the handheld game device 1050 and a tilt in the Z-axis direction thereof.

In one embodiment, the mesh network game controller 1000 can be an add-on to an existing game controller in the form of an add-on cartridge. The cartridge includes accelerometers as well as a mesh network wireless radio for transmitting data as well as for determining player position in the cartridge. The accelerometer outputs and in-door position outputs are transferred from the handheld game device 1000 to the game device 400. A player object position data storage area 405b stores position data (X, Y, Z in the world coordinate system) of the player object in the virtual game space. A non-player object position data storage area 405c stores position data (X, Y, Z in the world coordinate system) of the respective non-player objects. A viewpoint data storage area 405d stores viewpoint coordinates (Cx, Cy, Cz) used in three dimensional image processing. A light source data storage area 405e stores light source coordinates (Lx, Ly, Lz) used in the three dimensional image processing. A basic position data storage area 405f stores an X-axis direction output value and a Z-axis direction output value of the acceleration sensor 154, which are output when the handheld game device 1000 is held in a basic position (a position in which a tilt of the handheld game device 1000 is assumed to be 0 degrees) determined before the game is started. An additional game parameter data storage area 405g stores additional game parameter data (for example, vital power data or item data, etc., of the player character). A program storage area 405h stores transferred program data that has been read from the DVD-ROM 50.

More information on the acceleration sensor data usage is discussed in U.S. Pat. No. 6,908,388, the content of which is incorporated by reference.

Additionally, one or more shock sensors can be attached to the player or a suitable target such as a punching bag and data can be transmitted using the mesh network for enhancing game realism. When the player subjects the shock sensor to a shock with a magnitude which equals or exceeds the shock sensor sensitivity, an electrical signal is generated and transmitted to the processor. The processor can be programmed for a delay period which precedes the performance evaluating cycle. The player's reaction time and shock magnitude can be measured and displayed. The devices and methods are suitable for evaluating the player's performance even if the athlete does not contact a target or an another object such as in simulated martial arts combat wherein there is no body contact between the athletes. More information on the shock sensors is disclosed in U.S. Pat. No. 5,605,336, the content of which is incorporated by reference.

Figure 5:
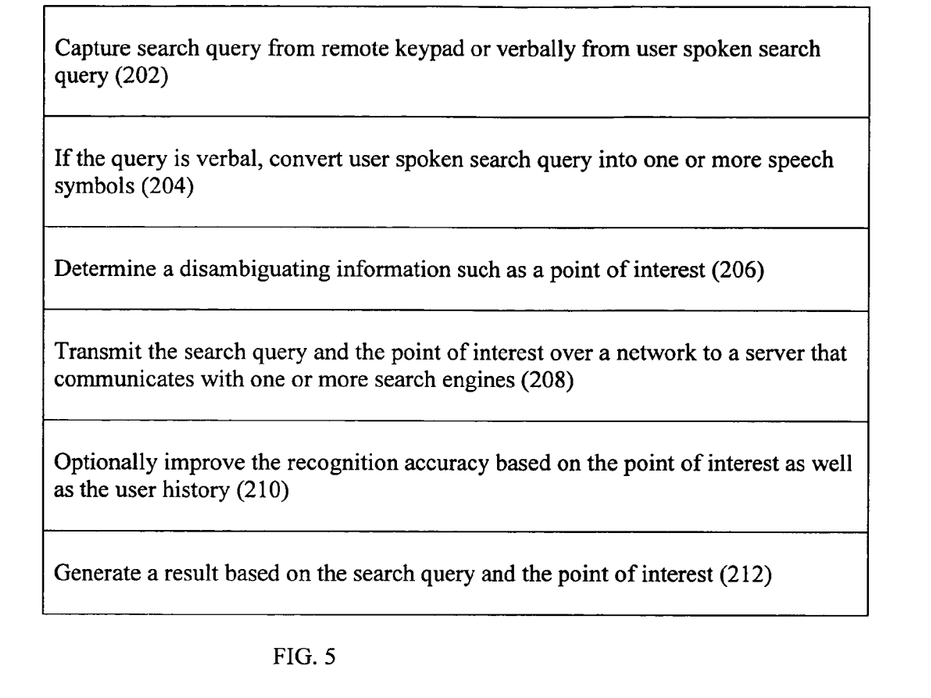
FIG. 5 shows an exemplary process for using the game controller to submit a search query to a remote server.

FIG. 5 shows an exemplary process for sending a search query from the game controller of FIG. 3 to a remote server for searching information. The process captures a search query specified through the game controller keypad or user speech (202). If the user opts to use a voice search, the game controller converts user speech into one or more speech symbols (204). The speech symbols can be phonemes, diphones, triphones, syllables, and demisyllables. The symbols can be LPC cepstral coefficients or MEL cepstrum coding technique can be used as symbols as well. More details on the conversion of user speech into symbols are disclosed in U.S. Pat. No. 6,070,140 entitled "Speech Recognizer" by the inventor of the instant application, the content of which is incorporated by reference.

Next, the process determine a point of interest such as an XY coordinate, a city name, a zip code, or an address (206). The process transmits the typed search query or the speech symbols representing the verbal search and the point of interest over a network to a search engine (208). The search engine can perform the search and, where the search query is verbal, the server can optionally improve the recognition accuracy based on the point of interest as well as the user history (210). For example, if the user pronounces "Starbucks 95135" to try to locate a Starbucks coffee shop in the area with zip code 95135, the system based on prior user requests, would initiate a search query for Starbucks in the area with zip code 95135. The system generates a search result based on the speech symbols and the point of interest (212). The user can scroll the search results and identify the entity that he/she would like to contact. Alternatively, the user can press a button to indicate that the entity should call back the user.

In one embodiment, merchants pay the operator of the system for the privilege of calling the user back. Consumers simply elect to be called back by a merchant, by selecting the merchant. The server then bridges the mobile phone with the merchant automatically. The service is useful when traveling or when the user is unable to write down a number. Merchants pay to have their listings first. The user still gets listings for all merchants in the category he or she selects.

In addition to free text search, the system can also search predefined categories as well as undefined categories. For examples, the predefined categories can be sports, stocks, flight status, package tracking, price comparison, weather, yellow pages, movie show times, wifi hotspots, news, hotel reservations, drink recipes, jokes, horoscopes, or pickup lines, for example.

In yet other embodiments, the voice search system can provide mobile access to virtually any type of live and on-demand audio content, including Internet-based streaming audio, radio, television or other audio source. Wireless users can listen to their favorite music, catch up on the latest news, or follow their favorite sports.

The system can also automatically send information to the mobile device via text messages. An alert can be created for specific sports teams, leagues, weather reports, horoscopes, stock quotes and more. Alerts can be set on a regular delivery schedule or for event-triggers such as stock quote and sports score changes. Event-triggered alerts keep users informed about real-time changes to things that they care about. For example, sports alerts can provide instant updates at the end of a period, inning, quarter, half, game or golf round for MLB, NBA, NFL, NHL, PGA and all major college sports, instant updates when the score changes (excluding NBA) Stock Alerts, instant updates for user-specified stocks or funds at market open and/or close, or instant updates for designated percentage change in price or specified price targets, among others. "By giving users the choice to receive event-triggered alerts, users can stay current on the latest changes in their portfolio or with their favorite teams, they can make more informed decisions, save time, and stay in the know continuously about subjects and events that are important to them. Event-triggered alerts are an addition to periodic alerts that can be scheduled for delivery at the time and preference of the user. Periodic alerts include 5-day weather forecasts, daily horoscopes, plus sports and stock alerts that can be set to a time of day instead of an event.

In one implementation, an audio alert can be sent. First, text announcing the alert is sent to the subscriber's cell phone. A connection is made to the live or on-demand audio stream. The user listens to the announcement as a live or on-demand stream. The system provides mobile phone users with access to live and on-demand streaming audio in categories such as music, news, sports, entertainment, religion and international programming. Users may listen to their favorite music, catch-up on latest news, or follow their sports team. The system creates opportunities for content providers and service providers, such as wireless carriers, with a growing content network and an existing and flourishing user base. Text-based or online offerings may be enhanced by streaming live and on-demand audio content to wireless users.

In one implementation, if the user is interested in searching for a store called "Starbucks" in the current vicinity of the user, he/she would type or speak "Starbucks" to the mobile system computer, the system recognizes that the user is looking for Starbucks in his/her vicinity and would automatically determine its current position and append the position into the search term query. Hence, by speaking "Starbucks", the system would determine the location of the cell phone and create a query searches for Starbucks in San Francisco, for example. In this manner the user can search for services, people, products and companies that are local to her or him with minimum effort.

In an implementation where the location information is manually entered, the system that interprets the user request intelligently. For example the user can search for services, people, products and companies by telephone area code, by Zip Code, or by airport code. For example, to find a store called "Starbucks" in San Francisco, the user can speak to the cell phone:
   Starbucks san francisco CA
   Starbucks san fran (does partial match no state)
   Starbucks 415 (by area code)
   Starbucks 94118 (by Zip Code)
   Starbucks SFO (by airport code)

In the event the system cannot understand the request, the system presents a template with the pre-formatted search string and the user can edit the template and submit the search request in the template format.

In one embodiment, the search engine is a taxonomy search engine (TSE). TSE is a web service approach to federating taxonomic databases such as Google or specialized databases from retailers, for example. The system takes the voice based query (expressed in phonemes, for example), converts the speech symbols into query text and the query is sent to a number of different databases, asking each one whether they contain results for that query. Each database has its own way of returning information about a topic, but the details are hidden from the user. TSE converts the speech symbols into a search query and looks up the query using a number of independent taxonomic databases. One embodiment uses a wrapper-mediator architecture, where there is a wrapper for each external database. This wrapper converts the query into terms understood by the database and then translates the result into a standard format for a mediator which selects appropriate information to be used and formats the information for rendering on a mobile phone.

In another embodiment, the system can handle structured and unstructured databases. The system uses ontologies, each of which is a vocabulary detailing all the significant words for a particular domain, like healthcare or music or video or a consumer item, and the relationship between each word. The system then recognizes these terms in their particular context.

A plurality of ontology systems can be used: one ontology to analyze unstructured information, another to analyze databases or other structured information, and a third to unify the two by data sets. So while a music listener can think of 'U2' as a band, a cell phone can think of 'U2' as a ring-tone, a newspaper might refer to a 'U2' for an incident, a military database might use the terms 'U2' for a spying plane, among others. In one implementation, the system semi-automatically builds and maintains domain specific ontologies. The system performs automatic detection and extraction of events in textual data and integrates the textual temporal information which has been extracted, in a document warehouse. The system provides temporal knowledge discovery of items for trends analysis.

In one aspect, the system semi-automatically builds and maintains domain specific ontologies. The system automatically generates ontology by examining numerous samples of the type of information typically being searched. The system then analyzes and produces a provisional ontology, which can be adjusted by users' acceptance or rejection of the search results to create a definitive ontology.

In another exemplary TSE, the system searches taxonomic databases that are related together. For instance, if the game controller user enters "U2", the system based on the ontological and/or taxonomical knowledge of "U2" searches databases relating to music, and locating music vendors of similar content as search results. The search results are provided as a series of links that are displayed on the game controller for the user to select. In one option, the user can select an item and request the vendor to call the user back to complete the sales transaction. In another option, the system automatically fills in an order form and displays to the user for approval prior to submitting the information to the selected vendor. In one implementation, the vendor in turn pays a commission to the system for the sales referral.

In one embodiment, the system includes a multidimensional knowledge map. The knowledge map includes concepts. The concepts are organized into taxonomies. Each taxonomy includes a hierarchical structure. One taxonomy can be a first concept that is ordered with respect to a second concept independent of the hierarchical structure. The content provider system also includes content items. The items can be tagged to the concepts using a value of a structured data attribute associated with the items. In one example, the tagged item is selected from the group consisting of a user query, a user attribute, and a resource. In another example, the item is tagged to at least one of the concepts using at least one keyword included in the item. In another example, the first concept includes a first mapping function including an input and an output. The input of the first mapping function includes a value of a structured data attribute of at least one item. The output of the first mapping function indicates whether to tag the item to the first concept. In a further example, the second concept includes a second mapping function. The second mapping function includes an input and an output. The input of the second mapping function includes a value of a structured data attribute of at least one item. The output of the mapping function indicates whether to tag the at least one item to the second concept, such that the at least one item tagged to the first concept is ordered with respect to the at least one item tagged to the second concept. In one example, the input of the first mapping function includes information obtained from a source external to the system that is used in providing the output of the first mapping function. In another example, the input of the first mapping function uses information about how the at least one item tags to other concepts in providing the output of the first mapping function. In a further example, the input of the first mapping function uses information about at least one keyword included in the at least one item in providing the output of the first mapping function.

The system can have a multidimensional knowledge map. The system can execute a process that includes organizing concepts into groups representing dimensions of a domain, including ordering a first concept with respect to a second concept in the same group, using at least one structured data parameter, tagging at least one item to at least one of the first and second concepts, and constraining a user's search to only one of the first and second concepts. In another embodiment, one or more items are tagged to at least one of the first and second concepts based at least in part on a first structured data parameter that is modified based on an indication derived from at least one previous user's interaction with the system. In one variation on this embodiment, the tagging is also based on at least one of: a second structured data parameter, language associated with the item, and a second tag associated with the at least one item. In another example, the tagging is also based on at least one of whether the at least one previous user's interaction with the system was deemed successful and context information obtained from a dialog interaction with the at least one previous user. In one embodiment, a gateway provides the search service to POTS/PSTN telephone callers with minimum modification of the existing system.

In one embodiment, an inquiry can be entered by a game controller user. The game controller user can type the inquiry on the game controller keypad or speak the inquiry to the phone. In one embodiment, the spoken inquiry is captured by the server and speech recognition software at the server can convert the spoken inquiry into text and sent back to the display of the phone for confirmation. In another embodiment, the spoken inquiry can be converted into phonetic equivalent and transmitted as a message such as SMS message or email or WAP message to the server. As noted, the inquiry can be a natural language query, a boolean logic query specifying one or more search terms, or any combination thereof. The server then processes the received inquiry. For example, the inquiry can be parsed to identify keywords, search terms, and boolean operators. If the inquiry is a natural language inquiry, the language can be grammatically parsed to identify likely search terms and discard words which are not relevant to the subject or domain of the inquiry.

Next, the server can determine whether a relevant taxonomy model exists. In particular, using the search terms, the server can examine previously determined taxonomy models to determine whether the domains, types, and/or sub-types of an existing taxonomy model include any common information such as search terms. This determination can be performed with reference to the dictionary and thesaurus databases. That is, the search for an existing taxonomy model can be expanded to include terms specified by the dictionary and/or thesaurus databases which are synonymous and/or related to terms of the inquiry. Accordingly, although an inquiry may not include terminology that is identical to an existing taxonomy model, the server can identify related models by cross referencing the taxonomy model terminology with the inquiry terminology using the dictionary and thesaurus databases. As the dictionary and thesaurus databases can include both predetermined information as well as user configured information, the user can specify relationships between terms and domains such that the server can identify relationships among inquiries and existing taxonomy models despite the existence of only an indirect relationship between the inquiry and taxonomy model.

If one or more existing taxonomy models are found to have an association with the received inquiry, the identified taxonomy models can be used as a seed or basis for generating a new taxonomy model. In particular, attributes from the identified taxonomy models can be used as a baseline model. For example, Internet sites, search engines, databases, and/or Web pages used in the existing taxonomy model can be given higher priority than had no related taxonomy model been identified. Similarly, previously identified relationships between domain types, domain subtypes, and text passages of the existing taxonomy model can be re-examined by the server and used in recursive searches to be described herein in greater detail.

If no existing taxonomy model is relevant to the inquiry, a new taxonomy model is initialized. The server can access the dictionary database and the thesaurus database to identify alternative search terms and phrases to those specified in the inquiry. Accordingly, the server can broaden the scope of the inquiry to encompass synonymous, related, and/or relevant terms without requiring the user to specify an unduly large or complex inquiry. As the dictionary and thesaurus databases can include references to designated search engines suited to the subject matter of that entry, the server further can identify those search target engines which will be searched in response to the broadened inquiry. For example, if the user types "U2", the server searches all music related sites for the available albums from "U2" since the search came from a phone and users are unlikely to search for U2 spy-planes on a game controller. The user can be more specific and enter "U2 review" and the system would search Google or Yahoo or MSN search engines for reviews of the band, sort/filter/remove redundancy and presents articles that the user can review on the rather limited screen of the game controller. Thus, the user can do research using the limited I/O of the phone if necessary, but the default is to assume that the user wants assistance to buy or to get to a particular location rather than to do in-depth research on the limited game controller screen and keypad.

The server can generate and send queries based upon the initial user inquiry. The server can access the rules of the query protocol database to determine the query format associated with the target search engines. Accordingly the server can translate the received inquiry into one or more queries to be directed to the target search engines. Thus, each resulting query can conform the format required by the particular search engine to which the query is to be directed.

Results from the various target search engines can be received by the server. For example, from each of the target search engines, the server can receive a listing of references in response to the queries provided. The received references can be processed and prioritized. For example, the server can merge the various lists of URLs into a single list, remove duplicate URLs, and prioritize the remaining list according to the prioritization hierarchy specified by the research rules. Copies of the references specified by the processed listing of references can be retrieved. The text of the retrieved references can be extracted by removing any formatting tags or other embedded electronic document overhead. For example, any visual formatting of the text, content labeling of the data, or other data annotations can be removed from the retrieved references.

The server can take a course of action given the existence of particular word and/or text associations within a text passage including, but not limited to acronyms, syntactic variants, synonyms, semantic variants, and domain associations. For example, the rules can specify that a search is to be initiated for each identified acronym such that the resulting taxonomy model and report include information about the acronyms. Acronyms can be identified by identifying terms in all capital letters, using grammatical rules, and/or by specifying the terms within the dictionary and/or thesaurus databases.

Each of the aforementioned word and/or text associations identified within relevant text passages can be recursively identified within newly determined search results and recursively submitted to the various search engines to progressively acquire additional information. Taking another example, an original query for "jazz" can reveal that Acid Jazz, Avant Garde & Free Jazz, Bebop, Brazilian Jazz, Cool Jazz, Jazz Fusion, Jazz Jam Bands, Latin Jazz, Modern Post-bebop, New Orleans Jazz, Smooth Jazz, Soul-Jazz & Boogaloo, Swing Jazz, Traditional Jazz & Ragtime, and Vocal Jazz are relevant terms. In this example, the system may recursively submit queries for each type of jazz music to progressively acquire further facts. The system may identify the top ten purchased or downloaded musician in a particular jazz music type and present that as the search sub-result to the user. The system is also aware of URLs of top retailers for a particular band and can add these URLs into the search sequence on a periodic basis such as on a daily or hourly basis.

After having identified the key relationships as well as the domain types and subtypes, a taxonomy model can be generated to summarize information discovered as a result of the inquiry. The taxonomy model can be formulated as a relational graph where nodes representing domain types are linked with child nodes clustered around the domain type. The child nodes represent the domain subtypes. Each of the nodes, whether a domain type or a domain sub-type, can include one or more attributes. Any incidental terms occurring infrequently can be pruned from the taxonomy model. Accordingly, the resulting clusters of domain types and domain sub-types represent the hierarchy between general and more specific concepts.

Off-line, the server can analyze the taxonomy model to identify patterns within the taxonomy model to provide faster and more accurate search results. The rules can specify particular relationships of interest in the taxonomy model. For example, the research rules can indicate that attributes which co-occur within one concept may be relevant to peer concepts, that concepts which share common attributes may form clusters of potential significance, relationships which divide clusters into mutually exclusive subsets are potentially significant, relationships which generate intersections among distinct clusters are potentially significant. The server can formulate additional sub-queries to provide the target search engines. For example, the sub-queries can specify new combinations of search terms such as domain types, domain sub-types, and attributes as determined from the research rules and the relational graph. Exemplary pattern rules can include "if type X has attribute Y, then search for other types with attributes of Y" and "if type X has attribute Y, then search for X having an attribute Y with alternative values for Y." Continuing with the previous example, execution of the exemplary pattern rules can generate sub-queries such as "are there other items like U2 band." The results of the sub-queries can be incorporated into the existing taxonomy model.

The determined taxonomy model can be presented to a system administrator for approval. The administrator can add elements to the taxonomy model, delete elements from the taxonomy model, and/or reorder the contents of the taxonomy model. Once the model is accepted by the administrator, edits to the taxonomy model can be incorporated. A report can be generated for review and can include the relational graph of the taxonomy model, a taxonomy outlining the domain of the taxonomy model, text descriptions of key concepts, attributes and relationships, as well as citations linking derived results to the original source documents. The resulting taxonomy model and research report can be stored for subsequent use.

The search result is accurate and provides relevant information for the needs of a game controller user. The system brings the advantages of the Internet to game controllers that are designed to work over the POTS/PSTN network. One such benefit is the ability to access Internet search engines for POTS/PSTN phones. It lends itself to various embodiments, each of which delivers the information in a text data format but in a different interface manner. The use of a gateway connection between the server and the POTS network provides the greatest degree of service expansion in that the text data may be provided in conjunction with a standard audio delivery, or it may be provided as a direct access database in which no voice call is involved. This is a high value added service which is of immediate benefit to both the client and the game controller service provider. In consideration of its high value and in the flexibility of its delivery, the game controller service provider has a variety of options in charging for the service. This may include a flat monthly subscription fee for all subscribers which eliminates the need for transaction billing, reducing both the service cost to the provider as well as the service charge to the customer.

In another aspect, a game controller system for making free VOIP calls includes a handset with a display, a keypad, and a modem communicating with a remote server. The user make local and long distance calls for free and in addition may have access to value added services that include but not be limited to music, food, restaurant, movie, map, telephone directory, news, blogs, weather, stocks, calendar, sports, horoscopes, lottery, messages, or traffic database. The display of the phone periodically shows information of interest to the user (such as ads), based on a profile that the user makes when registering with the system. The profile is updated to track services and products as the user actually uses.

Other revenue models can be used. In one embodiment, the system acts as brokers or market-makers: the system brings buyers and sellers together and facilitates transactions. Brokers play a frequent role in business-to-business (B2B), business-to-consumer (B2C), or consumer-to-consumer (C2C) markets. Usually a broker charges a fee or commission for each transaction it enables. The formula for fees can vary. Brokerage models include: Buy/Sell Fulfillment—takes customer orders to buy or sell a product or service, including terms like price and delivery; Demand Collection System—where a prospective buyer makes a final (binding) bid for a specified good or service, and the broker arranges fulfillment; Auction Broker—conducts auctions for sellers (individuals or merchants) Broker charges the seller a listing fee and commission scaled with the value of the transaction; Transaction Broker—provides a third-party payment mechanism for buyers and sellers to settle a transaction; Distributor—a catalog operation that connects a large number of product manufacturers with volume and retail buyers and where Broker facilitates business transactions between franchised distributors and their trading partners; Search Agent—a software agent or "robot" used to search-out the price and availability for a good or service specified by the buyer, or to locate hard to find information; Virtual Marketplace—or virtual mall, a hosting service for online merchants that charges setup, monthly listing, and/or transaction fees.

Alternatively, an advertising model can be used where advertisers pay for referrals or clicks from the game controller. A high volume of user traffic makes advertising profitable and permits further diversification of site services. For example, the system can search classifieds—list items for sale or wanted for purchase. In another embodiment, the system provides free to access but require users to register and provide demographic data. Registration allows inter-session tracking of user surfing habits and thereby generates data of potential value in targeted advertising campaigns. The system can also support Contextual Advertising/Behavioral Marketing. For example, a game controller extension that automates authentication and form fill-ins, also delivers advertising links or pop-ups as the user surfs the web. Contextual advertisers can sell targeted advertising based on an individual user's surfing activity. The system can support Content-Targeted Advertising that identifies the meaning of a web page and then automatically delivers relevant ads when a user visits that page. The system can display Intromercials—animated full-screen ads placed at the entry of a site before a user reaches the intended content.

In another business model, the system acts as an Infomediary that provides data about consumers and their consumption habits used to target marketing campaigns. Independently collected data about producers and their products are useful to consumers when considering a purchase.

In another embodiment, the system provides Incentive Marketing—customer loyalty program that provides incentives to customers such as redeemable points or coupons for making purchases from associated retailers. Data collected about users is sold for targeted advertising. The system can also be a Metamediary that facilitates transactions between buyer and sellers by providing comprehensive information and ancillary services, without being involved in the actual exchange of goods or services between the parties.

The system can also be a merchant, wholesalers and retailers of goods and services. Sales may be made based on list prices or through auction. The system can also be a merchant that deals strictly in digital products and services and, in its purest form, conducts both sales and distribution of contents such as music/video/call tone/ring tone over the web.

The system performs automatic detection and extraction of events in textual data and integrates the textual temporal information which has been extracted, in a document database. The system provides temporal knowledge discovery of items for trends analysis.

The system can use ontology with non-text information as well. Many repositories of digitized or electronic images, graphics, music and videos have been built. However, searching such multimedia files is still difficult. In one embodiment, the system performs speech recognition on the video and converts speech into text for searching. The converted text is stored as meta-tags associated with the music or video, and upon selection in response to a search, the music or video can be displayed for playing or for purchase.

In another embodiment, a system locates a predetermined multimedia file by having users upload a plurality of image, music and video files to a server, each file including multimedia data such as image or video or audio data and meta data describing the content; extracting the multi-media data and meta-data from the multimedia files; updating a search engine index with the meta-data; and subsequently locating the predetermined multimedia file using the search engine.

In the above-described embodiment, a method for determining a rotation axis of viewpoint has different variants as follows. In a first variant, when the tilt sensor detects that the housing is tilted to the right or the left, the Z-axis of the local coordinate system of the player object is assumed to be a predetermined axis, and the viewpoint is rotated about the above-described predetermined axis. Also, when the tilt sensor detects that the housing is tilted forward or backward, the viewpoint is rotated about the X-axis of the local coordinate system of the player object. In the above-described embodiment, the Z-axis of the viewpoint coordinate system is projected onto the XZ plane of the world coordinate system, and the projected axis is determined as the predetermined axis. Otherwise, in a second variant, the Z-axis itself of the viewpoint coordinate system is assumed to be the predetermined axis. Similarly, in a third variant, the Z-axis of the viewpoint coordinate system is projected onto an XZ plane of a local coordinate system of an object (for example, a player object), and the projected axis is assumed to be the predetermined axis. Also, the Z-axis of the viewpoint coordinate system is projected onto a topographic object (a ground object on which the player object is placed), and the projected axis is assumed to be the predetermined axis.

In another embodiment where the game controller includes a built-in camera for video communication, the user captures and transmits video taken with a camera on the game controller. The user can perform simple edits to the video segment. The system allows the editing user more creative freedom at each step in the process, such as being able to preview and correct each edit decision on the fly. The video editing process becomes similar to putting together a document or graphics presentation where the user cuts and pastes the segments together adding effects and titles.

The software can provide Linear Editing where the content can only be edited sequentially similar to older mechanical techniques of cutting films to perform the edit functions. The software can alternatively provide Non-Linear Editing where editing in this environment is essentially is a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying). This process requires at the least, a Camcorder and VCR. the original footage remains intact, but the rearranged footage is transferred to a new tape. Each scene or cut is "assembled" on a blank tape either one-at-a-time or in a sequence. The system can provide two types of Assemble Editing: 1) A Roll—Editing from a single source, with the option of adding an effect, such as titles or transitioning from a frozen image the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the title between scenes, previously shot, during the editing process.

The system supports Sound Mixing where two or more sound sources can be connected to a sound mixer and then inputted into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents need to be reduced into chunks of one, five, ten or fifteen minutes, for example, to allow easy viewing while the user is traveling or otherwise don't have full attention on the device for an extended period. In one embodiment, video is micro-chunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The micro-chunks can be e-mailed, linked to, searched for, downloaded, remixed, and made available on-line.

The user or producer can embed meta data into the video or music. Exemplary meta data for video or musical content such as CDs includes artist information such as the name and a list of albums available by that artist. Another meta data is album information for the title, creator and Track List. Track metadata describes one audio track and each track can have a title, track number, creator, and track ID. Other exemplary meta data includes the duration of a track in milliseconds. The meta data can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The meta data can contain release status information with possible values of: StatusOfficial, StatusPromotion, StatusBootleg. Other meta data can be included as well.

The meta-data can be entered by the musician, the producer, the record company, or by a music listener or purchaser of the music. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The meta data associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalty on behalf of its users and supports the webcasting of music according to the Digital Millennium Copyright Act, 17 U.S.C. 114. The system obtains a statutory license for the non-interactive streaming of sound recordings from Sound Exchange, the organization designated by the U.S. Copyright Office to collect and distribute statutory royalties to sound recording copyright owners and featured and non featured artists. The system is also licensed for all U.S. musical composition performance royalties through its licenses with ASCAP, BMI and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips and/or videos. The system also identifies music clips or videos in a multimedia data stream and prepares a summary of each music video that includes relevant image, music or video information. The user can search the music using the verbal search system discussed above. Also, for game playing, the system can play the music or the micro-chunks of video in accordance with a search engine or a game engine instruction to provide better gaming enjoyment.

In one gaming embodiment, one or more accelerometers may be used to detect a scene change during a video game running within the game controller. For example, the accelerometers can be used in a tilt-display control application where the user tilts the mobile phone to provide an input to the game. In another gaming embodiment, mobile games determine the current position of the mobile device and allow players to establish geofences around a building, city block or city, to protect their virtual assets. The mobile network such as the WiFi network or the cellular network allows players across the globe to form crews to work with or against one another. In another embodiment, digital camera enables users to take pictures of themselves and friends, and then map each digital photograph's looks into a character model in the game. Other augmented reality game can be played with position information as well.

In one embodiment, the game controller's processor and transceiver conform to the ZigBee protocol. ZigBee was created to address the market need for a cost-effective, standards-based wireless networking solution that supports low data-rates, low-power consumption, security, and reliability. Single chip ZigBee controllers with wireless transceivers built-in include the Chipcon/Ember CC2420 and from Free-Scale. In various embodiments, the processor communicates with a Z axis accelerometer measures the patient's up and down motion and/or an X and Y axis accelerometer measures the patient's forward and side movements. The controllers upload the captured data when the memory is full.

The game controller can also be used for home automation. The user can enjoy flexible management of lighting, heating and cooling systems from anywhere in the home. The watch automates control of multiple home systems to improve conservation, convenience and safety The watch can capture highly detailed electric, water and gas utility usage data and embed intelligence to optimize consumption of natural resources. The system is convenient in that it can be installed, upgraded and networked without wires. The patient can receive automatic notification upon detection of unusual events in his or her home. For example, if smoke or carbon monoxide detectors detect a problem, the wrist-watch can buzz or vibrate to alert the user and the central hub triggers selected lights to illuminate the safest exit route.

In another embodiment, the game controller serves as a mobile telephone when there are sufficient ZigBee radios in a particular neighborhood. In that case, calls are routed through the mesh network to the game controller for voice calls.

In another embodiment, the controller serves a key fob allowing the user to wirelessly unlock doors controlled by ZigBee wireless receiver. In this embodiment, when the user is within range, the door ZigBee transceiver receives a request to unlock the door, and the ZigBee transceiver on the door transmits an authentication request using suitable security mechanism. Upon entry, the ZigBee doorlock device sneds signals to the lighting, air-conditioning and entertainment systems, among others. The lights and temperature are automatically set to pre-programmed preferences.

Although ZigBee is mentioned as an exemplary protocol, other protocols such as Bluetooth and WiFi and WiMAX can be used as well.

In one embodiment that captures user commands or status non-verbally, the user may wear one or more sensors, for example devices for sensing ECG, EKG, blood pressure, sugar level, among others. In one embodiment, the sensors are mounted on the patient's wrist (such as a wristwatch sensor) and other convenient anatomical locations. Exemplary sensors include standard medical diagnostics for detecting the body's electrical signals emanating from muscles (EMG and EOG) and brain (EEG) and cardiovascular system (ECG). Leg sensors can include piezoelectric accelerometers designed to give qualitative assessment of limb movement. Additionally, thoracic and abdominal bands used to measure expansion and contraction of the thorax and abdomen respectively. A small sensor can be mounted on the subject's finger in order to detect blood-oxygen levels and pulse rate. Additionally, a microphone can be attached to throat and used in sleep diagnostic recordings for detecting breathing and other noise. One or more position sensors can be used for detecting orientation of body (lying on left side, right side or back) during sleep diagnostic recordings. Each of sensors can individually transmit data to the server 20 using wired or wireless transmission. Alternatively, all sensors can be fed through a common bus into a single transceiver for wired or wireless transmission. The transmission can be done using a magnetic medium such as a floppy disk or a flash memory card, or can be done using infrared or radio network link, among others.

In one embodiment, the sensors for monitoring vital signs are enclosed in a wrist-watch sized case supported on a wrist band that communicates with the game controller. The sensors can include EEG, EMG, as well as skin resistance sensors to detect user's biological command for game playing purposes. The sensors can also be used for medical monitoring. For example, in one embodiment, Cygnus' AutoSensor (Redwood City, Calif.) is used as a glucose sensor. A low electric current pulls glucose through the skin. Glucose is accumulated in two gel collection discs in the AutoSensor. The AutoSensor measures the glucose and a reading is displayed by the watch.

In another embodiment, EKG/ECG contact points are positioned on the back of the game controller. In yet another embodiment that provides continuous, beat-to-beat wrist arterial pulse rate measurements, a pressure sensor is housed in a casing with a 'free-floating' plunger as the sensor applanates the radial artery. A strap provides a constant force for effective applanation and ensuring the position of the sensor housing to remain constant after any wrist movements. The change in the electrical signals due to change in pressure is detected as a result of the piezoresistive nature of the sensor are then analyzed to arrive at various arterial pressure, systolic pressure, diastolic pressure, time indices, and other blood pressure parameters.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art. The specific embodiments described herein are offered by way of example only. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
   a mesh network;
   a mesh network game controller coupled to the mesh network including one or more motion detectors and an in-door position detector;
   a display device coupled to the mesh network, wherein the mesh network comprises an 802.15 network, further comprising at least two additional mesh network appliances communicating with the mesh network game controller and to determine the mesh network game controller position using triangulation with devices in the 802.15 network; and
   a health condition sensor coupled to the game controller to sense at least one of: ECG, EEG, EMG, EOG, EKG, vital sign, blood pressure, sugar level, body orientation, body position, blood-oxygen level, pulse rate, throat condition, breathing, skin resistance, limb movement, thorax movement, abdomen movement.

2. The system of claim 1, wherein the mesh network game controller comprises a Voice Over Internet Protocol (VOIP) telephone.

3. The system of claim 1, comprising one or more motion detector sensors including a 3D acceleration sensor.

4. The system of claim 1, comprising one or more motion detector sensors to allow a player to perform one of: wield the game controller to simulate a sword, wave the game controller to simulate a conductor's baton, swing the game controller to simulate a baseball bat.

5. The system of claim 1, comprising a server coupled to the plain old telephone service (POTS) or public switched telephone network (PSTN), the server receiving a search query from the game controller; the server searching one or more databases based on the search query and returning a search result on the display.

6. The system of claim 5, wherein a remote party is coupled to the game controller over the Internet, wherein the remote party communicates with the mesh network game controller for multi-player gaming.

7. The system of claim 5, wherein the server transmits a caller identification (Caller ID) number to a third party entity for calling back a player and wherein the third party pays a fee for each Caller ID.

8. The system of claim 5, wherein the databases comprise one or more of: music, food, restaurant, movie, map, telephone directory, news, blogs, weather, stocks, calendar, sports, horoscopes, lottery, messages, traffic, direction.

9. The system of claim 1, comprising a mesh network appliance wirelessly coupled to the game controller to provide one of: home security, door access control, lighting control, power outlet control, dimmer control, switch control, temperature control, humidity control, carbon monoxide control, fire alarm control, blind control, shade control, window control, oven control, cooking range control, personal computer control, entertainment console control, television control, projector control, garage door control, car control, pool temperature control, water pump control, furnace control, heater control, thermostat control, electricity meter monitor, water meter monitor, gas meter monitor, remote diagnostic.

10. The system of claim 1, wherein the game controller is coupled to a cellular telephone to answer calls directed at the cellular telephone.

11. The system of claim 1, comprising a camera coupled to the mesh network and to the game controller.

12. The system of claim 1, wherein the game controller monitors player movements and falls.

13. The system of claim 1, wherein the in-door positioning detector is coupled to one or more mesh network appliances to provide location information.

14. The system of claim 1, comprising a health condition sensor coupled to the game controller to provide health feedback to a player.

15. The system of claim 1, comprising a wireless router coupled to the mesh network and wherein the wireless router comprises one of: 802.11 router, 802.16 router, WiFi router, WiMAX router, Bluetooth router, X10 router.

16. A system, comprising
a mesh network;
a network game controller coupled to the mesh network including one or more motion detectors and an in-door position detector; and
a display device coupled to the mesh network, wherein the mesh network game controller comprises a Voice Over Internet Protocol (VOIP) telephone; and
a server coupled to the plain old telephone service (POTS) or public switched telephone network (PSTN), the server receiving a search query from the game controller; the server searching one or more databases based on the search query and returning a search result on the display.

17. A game controller, comprising:
a mesh network;
a mesh network game controller coupled to the mesh network including a processor; a motion sensor including an accelerometer coupled to the processor; and
a player health condition sensor coupled to the processor to sense at least one of: ECG, EEG, EMG, EOG, EKG, vital sign, blood pressure, sugar level, body orientation, body position, blood-oxygen level, pulse rate, throat condition, breathing, skin resistance, limb movement, thorax movement, abdomen movement.

18. The game controller of claim 17, comprising a mesh network with at least two additional mesh network appliances communicating with the game controller processor and to determine game controller position using triangulation with the two mesh network appliances.

* * * * *